Oct. 23, 1923.
S. ZETTERBAUM
ROUTE INDICATOR
Filed Aug. 21, 1922
1,471,439
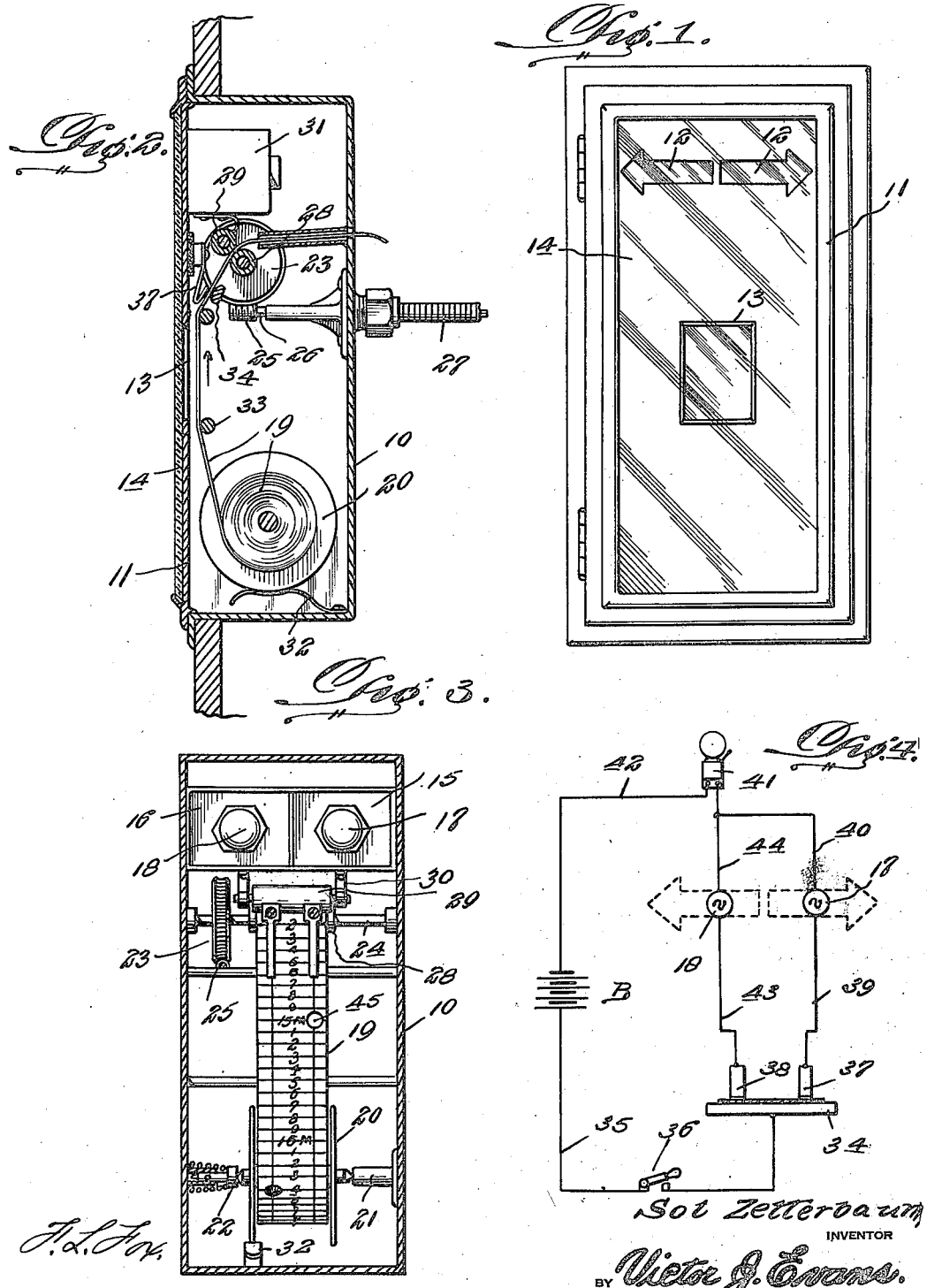

Patented Oct. 23, 1923.

1,471,439

UNITED STATES PATENT OFFICE.

SOL ZETTERBAUM, OF NEW YORK, N. Y.

ROUTE INDICATOR.

Application filed August 21, 1922. Serial No. 583,347.

*To all whom it may concern:*

Be it known that I, SOL ZETTERBAUM, a citizen of the United States, residing at New York, in the county of New York and State of New York, have invented new and useful Improvements in Route Indicators, of which the following is a specification.

This invention relates to route indicating devices and has for an object the provision of a device which may be attached to an automobile or other vehicle and connected to the usual speedometer or to the driving mechanism or wheels of the automobile and automatically operated to indicate the direction of travel along a given route.

Another object of the invention is the provision of a device of this character which includes a perforated tape for controlling the operation of the indicating mechanism, which tape is designed to be inserted in position at the beginning of a trip, so that the route of travel will be accurately pointed out.

With the above and other objects in view, the invention further includes the following novel features and details of construction, to be hereinafter more fully described, illustrated in the accompanying drawings and pointed out in the appended claim.

In the drawings:—
Figure 1 is an elevation of a route indicating device constructed in accordance with the invention.

Figure 2 is a vertical sectional view of the same.
Figure 3 is a similar view at right angles to Figure 2.

Figure 4 is a diagram showing the wiring of the device.

Referring in detail to the drawings, wherein like characters of reference denote corresponding parts, the reference charater 10 indicates a casing which is open at its front and which is normally closed by a hinged door 11, the latter being provided with transparent covered openings 12, which are shown in the form of oppositely disposed arrows. The door is further provided with a sight opening 13, the purpose of which will presently appear. The opening 13 is also transparent covered and for this purpose the door is provided with a glass panel 14 which extends over this opening and over the openings 12.

Located within the casing 10 behind the openings 12 are separate compartments 15 and 16 which contain electric lamps 17 and 18 respectively. These lamps are capable of being independently lighted so as to illuminate the openings 12 and the latter are in the form of arrows.

For the purpose of illuminating these arrows, there is provided a tape 19 which is adapted to be unwound from a spool 20, the latter being removably mounted in bearings 21 and 22, for which purpose the last named bearing is of a yieldable type.

The tape 19 is graduated, being preferably graduated into tenths of a mile, as shown in Figure 3 of the drawings and this tape is designed to be driven at a rate of speed which will approximate one-eighth of an inch of the tape, for one-tenth of a mile (more or less). For the purpose of operating the tape there is provided a worm gear 23 which is mounted upon a shaft 24 and this gear is driven by a worm 25 which is carried by the inner end of a shaft 26. This shaft extends beyond the casing 10 and is of a flexible type as shown at 27 and is designed to be operatively connected either to a speedometer, a wheel of the automobile, or to a suitable part of the driving mechanism, such as the transmission mechanism or the drive shaft of the vehicle. The tape passes between feed rollers 28 and 29, the former being mounted upon the shaft 24, while the latter is yieldingly mounted, being carried by spring arms 30 which extend from the outer walls of the compartments 15 and 16, the said compartments being formed in a casing 31 located within the casing 10. The roller 29 may thus be forced away from the roller 28 a sufficient distance to permit of the easy insertion of the tape 19 therebetween. In addition, the spring mounting of the roller 29 acts to maintain proper tension upon the tape for the proper feeding of the latter. The tape 19 is tensioned to prevent a too rapid unwinding from the spool 20 by means of a spring arm 32, which extends upwardly from the bottom of the casing 10 and engages one flange of the spool.

The tape passes over guide bars 33 and 34, the last mentioned bar forming a contact member which is included in circuit with a battery or other source of current B and is connected thereto by means of a conductor 35. A switch 36 is included in this conductor so as to open and close the circuit as desired.

The contact 34 is adapted to be engaged by spaced spring contacts 37 and 38 and the latter are mounted upon the door 11 and moved outwardly when the door is open to facilitate the insertion of the tape 19. The contact 37 is connected by a conductor 39 with the lamp 17 and the latter is connected by a conductor 40 with a bell or other audible signal 41 and the latter is in turn connected by means of a conductor 42 to the battery B. The contact 38 is connected by a conductor 43 to the lamp 18 and this lamp is tapped on to the conductor 40 by means of a conductor 44.

The tape 19 which travels between the conductor 34 and the conductors 37 and 38, separates these conductors and prevents a circuit from being closed through either of the lamps 17 or 18, so that the signals 12 are normally inactive. The tape however is provided with perforations 45, which are arranged at intervals and which permit the spring contact members 37 and 38 to engage the contact 34 and close a circuit through either the lamp 17 or 18, the particular circuit closed depending upon the position of the perforation 45. As before stated, the tape 19 is graduated into divisions of miles and fractions thereof and the perforations are arranged at proper intervals along these graduations, their positions depending upon the route represented by the particular tape used. For example, if a trip between two points is contemplated, a tape covering the route between these two points is inserted in the casing and is arranged to begin operation from a predetermined point of starting. While the automobile is traveling, the tape will be unwound and the driver will understand that he is to travel in a substantially straight direction until either the lamp 17 or 18 is illuminated. This will occur at the first point of turning, an opening 45 being so located in the tape as to permit contact between one of the spring contacts and the contact 34 so as to close a circuit through the proper lamp to indicate either a right or left hand turn. This operation will be repeated at the next turn, so that the driver of the automobile will be automatically directed at each turning point in the route of travel. When a circuit is closed through the lamp 17, the current will travel from the battery through the conductor 35, the switch 36, the contact 34, the contact 37 which is passed through an opening 45 in the tape 19, the conductor 42 back to the battery. When a circuit is closed through the lamp 18, the current will pass through the contact 38, the conductor 43, the lamp 18, the conductor 44, the conductor 40, the signal 41 and the conductor 42 to the battery, the current flowing from the battery through the conductor 43 and contact 38.

The sight opening 13 in the door 11 permits of a convenient inspection of the tape.

In addition to providing means for indicating right or left turns, the invention may also be used to indicate dangerous points along a highway, such as a railroad crossing, bridge, sharp curve, washout or other point, by perforating the tape at these points so as to permit the contacts to engage to close the circuit. The tape may therefore be perforated to indicate the smallest fractions of a mile.

The invention is susceptible of various changes in its form, proportions and minor details of construction and the right is herein reserved to make such changes as properly fall within the scope of the appended claim.

Having described the invention what is claimed is:—

A route indicating mechanism embodying a casing, separate open front lamp compartments therein, an electric lamp in each compartment, a door hingedly secured to the casing and having a transparent covered opening over each lamp compartment to provide separate signalling devices when the compartments are illuminated, a normally open circuit for each of the lamps, a source of current, a rigid contact member included in said circuits, a door carried separate spring contact member included in each circuit and adapted to engage the rigid contact member, a tape movable between the spring and rigid contact members to maintain the circuits in normally open position, said tape having perforations at predetermined points to permit the circuits to be independently closed and means whereby the tape may be moved at a speed proportionate to the speed of the automobile.

In testimony whereof I affix my signature.

SOL ZETTERBAUM.